US008068592B2

(12) United States Patent
Raniere et al.

(10) Patent No.: US 8,068,592 B2
(45) Date of Patent: *Nov. 29, 2011

(54) INTELLIGENT SWITCHING SYSTEM FOR VOICE AND DATA

(75) Inventors: Keith A. Raniere, Waterford, NY (US); Thomas A. Delaney, City Island, NY (US); Steven Danzig, Spokane, WA (US); Saul Miodownik, West Hempstead, NY (US)

(73) Assignee: Global Technologies, Inc., Spokane, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/401,689

(22) Filed: Mar. 11, 2009

(65) Prior Publication Data

US 2009/0175427 A1 Jul. 9, 2009

Related U.S. Application Data

(63) Continuation of application No. 12/046,576, filed on Mar. 12, 2008, which is a continuation of application No. 11/567,842, filed on Dec. 7, 2006, now Pat. No. 7,391,856, which is a continuation of application No. 10/805,795, filed on Jun. 17, 2004, now Pat. No. 7,215,752, which is a continuation of application No. 10/000,634, filed on Oct. 31, 2001, now Pat. No. 6,819,752, which is a continuation of application No. 09/567,854, filed on May 9, 2000, now Pat. No. 6,373,936, which is a continuation of application No. 09/203,110, filed on Nov. 30, 1998, now Pat. No. 6,061,440, which is a continuation of application No. 08/390,396, filed on Feb. 16, 1995, now Pat. No. 5,844,979.

(51) Int. Cl.
*H04M 3/56* (2006.01)
*H04N 7/15* (2006.01)
*H04M 3/523* (2006.01)

(52) U.S. Cl. ............... 379/202.01; 348/14.1; 370/260; 370/270; 375/222; 379/93.05; 379/93.09; 379/93.23; 379/93.37; 379/265.01; 379/900

(58) Field of Classification Search .............. 348/14.08, 348/14.1; 370/270, 206–267; 375/222; 379/90.01, 379/93.01, 93.05, 93.09, 93.14, 93.21, 93.26, 379/93.28, 93.37, 265.01, 266.01, 309, 900, 379/902, 202.01–206.01
See application file for complete search history.

(56) References Cited

U.S. PATENT DOCUMENTS 4,291,200 A 9/1981 Smith
(Continued)

FOREIGN PATENT DOCUMENTS

DE 4229359 1/1994
(Continued)

OTHER PUBLICATIONS

Stockbridge, C., "The Evolution of a Multimode Multilocation Audioconferencing System," Electro Conf. Record, Section 29/3, vol. 4 (Apr. 1979).
(Continued)

*Primary Examiner* — Harry Hong
(74) *Attorney, Agent, or Firm* — Schmeiser, Olsen & Watts, LLP

(57) ABSTRACT

A teleconferencing system for voice and data provides interconnections among user sites via a central station. User stations at user sites each alternate operation between a data mode connecting a user computer and modem to a user telephone communication path and a voice mode connecting a telephony circuit to the communication path. The teleconferencing system is adapted for conducting a voice conference over standard telephone lines while allowing simultaneous viewing of data objects such as slides, graphs, or text. A host computer connected to the central station serves as a central repository for storage and retrieval of data objects for use in teleconferences.

62 Claims, 13 Drawing Sheets

U.S. PATENT DOCUMENTS

| | | | |
|---|---|---|---|
| 4,524,244 | A | 6/1985 | Faggin et al. |
| 4,546,212 | A | 10/1985 | Crowder, Sr. et al. |
| 4,578,537 | A | 3/1986 | Faggin et al. |
| 4,656,654 | A | 4/1987 | Dumas |
| 4,719,617 | A | 1/1988 | Yanosy, Jr. et al. |
| 4,845,704 | A | 7/1989 | Georgiou et al. |
| 4,953,159 | A | 8/1990 | Hayden et al. |
| 4,987,586 | A | 1/1991 | Gross et al. |
| 5,065,425 | A | 11/1991 | Lecomte et al. |
| 5,136,586 | A | 8/1992 | Greenblatt |
| 5,142,565 | A | 8/1992 | Ruddle |
| 5,151,972 | A | 9/1992 | Lorenz et al. |
| 5,239,580 | A | 8/1993 | Bruno et al. |
| 5,365,577 | A | 11/1994 | Davis et al. |
| 5,440,624 | A | 8/1995 | Schoof, II |
| 5,444,476 | A | 8/1995 | Conway |
| 5,483,588 | A | 1/1996 | Eaton et al. |
| 5,625,679 | A | 4/1997 | Gutzmer |
| 5,844,979 | A | 12/1998 | Raniere et al. |
| 6,061,440 | A | 5/2000 | Delaney et al. |
| 6,373,936 | B1 | 4/2002 | Raniere et al. |
| 6,819,752 | B2 | 11/2004 | Raniere et al. |
| 7,215,752 | B2 | 5/2007 | Raniere et al. |
| 7,391,856 | B2 | 6/2008 | Raniere et al. |

FOREIGN PATENT DOCUMENTS

| | | |
|---|---|---|
| FR | 0041902 | 12/1981 |
| WO | WO/94/26056 | 11/1994 |

OTHER PUBLICATIONS

Higginbotham, A. F., et al., "Teleconference Systems," IBM Technical Disclosure Bulletin, vol. 22, No. 9, pp. 3923-3925 (Feb. 1980).

Tanigawa, H., et al., "Multipoint Communication Control for Document-Oriented Teleconferencing," 1988 Inter'l. Zurich Seminar on Digital Communications—Session A3, pp. 29-35, (Mar. 8-10, 1988).

Kazuhisa Watanabe, et al., "Audio and Visually Augmented Teleconferencing," Proceedings of the IEEE, vol. 73, No. 4, pp. 656-670 (Apr. 1985).

Pate, L. R., "Trends in Multimedia Applications and the Network Models to Support Them," Globecom 90 IEEE Global Telecommunications Conference & Exhibition—Session 308.6, vol. 1, pp. 317-321 (Dec. 2-5, 1990).

Horn, D. N., and Sharma, A., "A Versatile Audio Bridge for Multimedia Conferencing," Supercomm/ICC 94, pp. 1754-1762 (May 1-5, 1994).

Nakamura, K., et al., "Personal Multimedia Teleconferencing Terminal," IEEE International Conference on Communications—Session 211.2.1, vol. 1, pp. 123-127 (Apr. 15-19, 1990).

Reinhardt, A., "Doing It All on One Line," Byte, pp. 145-148 (Jan. 1995).

"VoiceView.RTM.: A New Protocol for Integrated Voice & Data Applications," brochure from Radish Communications Systems, Inc., pp. 1-11 (1994).

"Intel Technology Briefing—The Communicating PC Another Communications Breakthrough," sales brochure from Intel Corp. pp. 1-4 (1994).

Office Action (Mail Date Sep. 11, 2008) for U.S. Appl. No. 12/046,576, filed Mar. 12, 2008; Confirmation No. 1400.

Office Action (Mail Date Jul. 14, 2009) for U.S. Appl. No. 12/046,576, filed Mar. 12, 2008; Confirmation No. 1400.

INTELLIGENT SWITCHING SYSTEM FOR VOICE AND DATA

RELATED APPLICATIONS

This application is a continuation of Ser. No. 12/046,576 filed on Mar. 12, 2008; which is a continuation of Ser. No. 11/567,842, filed on Dec. 7, 2006, now U.S. Pat. No. 7,391,856; which is a continuation of Ser. No. 10/805,795, filed on Jun. 17, 2004, now U.S. Pat. No. 7,215,752; which is a continuation of Ser. No. 10/000,634, filed on Oct. 31, 2001, now U.S. Pat. No. 6,819,752; which is a continuation of Ser. No. 09/567,854, filed on May 9, 2000, now U.S. Pat. No. 6,373,936; which is a continuation of Ser. No. 09/203,110, filed on Nov. 30, 1998, now U.S. Pat. No. 6,061,440; which is a continuation of Ser. No. 08/390,396, filed Feb. 16, 1995, now U.S. Pat. No. 5,844,979. The entire teachings of these applications are incorporated herein by reference.

BACKGROUND OF THE INVENTION

During a voice teleconference, it is often desirable for two or more conference participants to be able to both view and discuss common data objects such as a set of images. For example, one participant may desire to conduct a slide presentation concurrent with a voice conversation among the participants. Systems which enable a person to receive and view image data over a telephone line concurrent with voice conversation are known. One such system interrupts the telephone conversation momentarily to allow visual data to be transmitted over the telephone line. Following the transmission of visual data, the voice communication can be automatically resumed. Other known systems for sharing voice and image data generally require relatively complex equipment, specially enhanced modems, or dedicated high speed digital lines such as Internal Services Digital Network. Still other systems require multiple telephone lines to handle both data object manipulation and voice. Generally, the known desktop teleconferencing systems are for point-to-point communications rather than multipoint, multiparty communications.

SUMMARY OF THE INVENTION

It would be advantageous to provide a teleconferencing system which avoids having to interrupt voice communication in order to transmit data objects such as images meant to be viewed and discussed concurrently. It would also be advantageous to be able to provide such a teleconferencing capability without requiring complex devices or dedicated lines. The above and other advantages are achieved by the present invention. In general, the teleconferencing provided by the present invention allows multiple users to conduct a voice conference over standard telephone lines while simultaneously viewing shared slides, graphs, text, or other data objects.

The improved teleconferencing system stores a common set of data objects, such as slides, in a digital computer associated with each participant prior to the start of a voice conference. Once a voice conference is underway, a lead speaker can generate audible signals (e.g., Dual Tone Multi-frequency (DTMF) tones) to which the computers respond to coordinate simultaneous display of the data objects on each participant's computer screen. Since the data objects are stored prior to the conference and the audible signals are sent with voice communications signals, the voice conversation can flow naturally and uninterrupted by data transmissions.

To facilitate storage and dissemination of the common data objects, a novel arrangement is employed whereby a host computer, preferably configured as a bulletin board system (BBS), serves as a central repository for collecting subsets of data objects from conference participants and combining the subsets into a common set prior to a conference. Participating speakers each initially connect to the host computer and transmit a subset of data objects to the host computer. Participants (speakers and conference attendees) in turn are able to retrieve the common set of data objects from the BBS host computer before entering into a voice conference.

The host computer connects to a central station having a crosspoint switching matrix for interconnecting participants, or users, into multipoint voice conferences. The participants connect to the central station over standard telephone lines. An inexpensive user station controlled by the participant's digital computer facilitates selection between voice and data modes of access to the central station and the host computer. A participant can generate and receive audible signals via the user station to control conference and switching actions in relation to the user station and the central station. For example, a participant can generate an audible signal which switches the participant's user station from a voice mode to a data mode and concurrently reconfigures the central station to connect the participant either to the BBS host computer or to another participant for data mode operation.

Accordingly, a voice/data teleconferencing system interconnects a plurality of user sites and a central site over a plurality of communication paths, such as telephone lines. Each user site may include a user digital computer connectable to a user modem for transmitting and receiving data signals. A host digital computer at the central site is connectable to a plurality of host modems for transmitting and receiving data signals to and from the user sites.

A user station located at each user site includes a data port connectable to a user modem, a telephony circuit capable of transmitting and receiving voice communications signals, and a mode selector for alternately connecting the data port and the telephony circuit to a communication path. The mode selector has a data mode position in which the data port is connected to the communication path and a voice mode position in which the telephony circuit is connected to the communication path and the data port is connected to a user modem loopback impedance. The mode selector is responsive to a selector control signal to switch from data mode to voice mode, and the selector defaults to the data mode in the absence of the selector control signal. Thus, in the data mode, data signals can pass between the data port and the communication path, and in the voice mode, voice communications signals can pass between the telephony circuit and the communication path while the user modem is held "off-hook" by the loopback impedance. The user digital computer is programmed to control the user station.

The user station further includes a tone generator and tone detector for respectively transmitting and receiving audible conferencing signals with the voice communications signals over the communication path.

A central station at the central site includes a plurality of line ports and a switching matrix for interconnecting the user stations. The switching matrix comprises a plurality of crosspoint switching elements, each switching element actuable to connect one line port to another line port in response to matrix control signals. The central station further includes a plurality of tone generators and tone detectors coupled to respective line ports for transmitting and receiving audible conferencing signals to and from user stations.

The central station further includes a plurality of computer ports connectable to respective host modems. The central station includes central selector means for alternately connecting a line port and a host modem loopback impedance to a respective computer port. The central selector means has a pass-through position in which the line port is connected to the computer port and a loopback position in which the host modem loopback impedance is connected to the computer port. The central selector means responds to central selector control signals to switch from a pass-through position to a loopback position and defaults to the pass-through position in the absence of central selector control signals, such that in the pass-through position, data signals can pass between a line port and a respective computer port.

The central station further includes a controller for controlling conference and switching actions in the central station.

According to another aspect of the invention, each user site can record audible conferencing signals and voice communications signals in a voice conference for playing back at a subsequent time in conjunction with simultaneous display of the data objects on the user computer screen.

The above and other features of the invention including various novel details of construction and combinations of parts will now be more particularly described with reference to the accompanying drawings and pointed out in the claims. It will be understood that the particular teleconferencing system embodying the invention is shown by way of illustration and not as a limitation of the invention. The principles and features of this invention may be employed in varied and numerous embodiments without departing from the scope of the invention.

DETAILED DESCRIPTION OF THE PREFERRED EMBODIMENT

Figure 1:
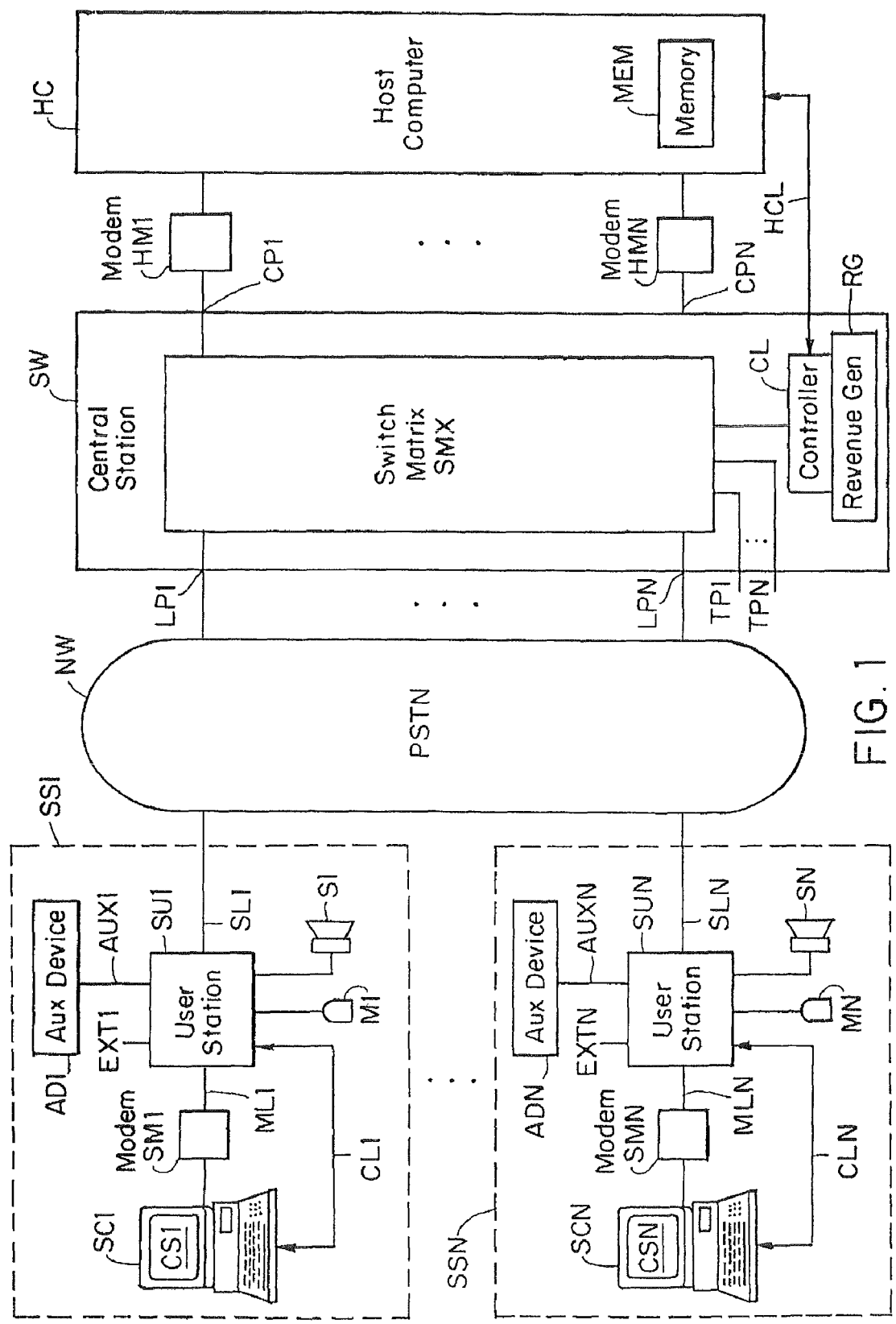
FIG. 1 is a block diagram of the teleconferencing system of the present invention.

In general, the teleconferencing provided by the present invention allows multiple users to conduct a voice conference while simultaneously viewing distributed slides, graphs, text, or other data objects. Shown in FIG. 1 is a block diagram of a preferred embodiment showing a plurality of user sites (SS1-SSN) connected to a central station SW over a plurality of user telephone lines (SL1-SLN). The central station SW provides connections between user digital computers (SC1-SCN) and a host computer HC preferably configured as a BBS server. The central station SW also provides interconnections among user sites (SS1-SSN) to provide conferencing services. Each user site includes a user station (SU1-SUN) for selecting between voice and data modes of access to the central station SW and the host computer HC.

Operation of the preferred embodiment of the present invention in a BBS environment will now be described at a high-level. A user at a user site SS1 initiates a data mode connection between the user computer SC1 and the host computer HC. Having established a data mode connection, the user enters into a typical data mode session with the host computer HC. One option presented to the user by the host computer HC is to enter a conference.

There are two general conferencing modes: voice mode and data mode. In voice mode conferencing, two or more users are interconnected via the central station SW. Users in a voice conference transmit and receive voice communications signals and audible conference control signals. The audible conference control signals, which can be DTMF tones, for example, are described in detail herein.

A user interface and conference control functions are also described further below.

The voice conferencing mode will now be described in further detail for the preferred embodiment. A key aspect of the present invention is the ability to conduct a voice conference among multiple users while simultaneously viewing shared data objects, such as slides. This aspect is achieved by having the individual users initially perform file transfers between their respective user computers (SC1-SCN) and the host computer HC in order to collect and disseminate the data objects required for a conference prior to the start of the voice mode portion of the conference. Thus, the host computer HC serves as a repository and distribution point for the data objects used in a conference. Further, conducting file transfers of the data objects prior to the voice mode portion of the conference eliminates interrupting the voice mode for downloads of data objects. For the initial file transfer of data objects, the respective user stations are placed in data mode and the central station SW is configured to pass-through data to the host computer HC.

"Data objects" can be any of several information types represented in any of a multiplicity of data formats. Data objects include, but are not limited to the following:

| Object | Type Description | File Format |
|---|---|---|
| image | Joint Photographic Experts Group (JPEG) | .JPG |
| image | graphics interchange format | .GIF |

-continued

| Object | Type Description | File Format |
| --- | --- | --- |
| image | fractal image compression | .FTC |
| video | full multimedia (MPEG) | .MPG |
| text | standard ASCII text | .TXT |
| rich text | Microsoft rich text format | .RTF |
| CAD | computer aided design | many |
| draw | drawing programs | .BMP & others |
| spreadsheet | spreadsheet programs | .XLS, .WK1 & others |
| word processing | word processing | .DOC & others |
| slides | slide presentation | .PPT & others |

The audible conference control signaling of the present invention can be used to emulate the application linking capabilities of Dynamic Data Exchange (DDE) and Object Linking and Embedding (OLE) for data object sharing within compatible applications at each user site during voice conferencing.

Once the multiple users enter the voice modes a virtual visual conference is established simultaneously with the voice conference whereby display of the data objects on each user computer can be coordinated. The data objects display coordination is accomplished by having a designated speaker select a current data object to be displayed, the selection of which causes the speaker's associated user station to generate an audible conference control signal. The conference control signal is transmitted in-band with voice communications signals to the other users in the conference. The user station of each of the other users in the conference detects the conference control signal which then causes the locally stored copy of the data object selected by the speaker to be displayed.

In an alternative embodiment, the equipment at each user site is adapted for point-to-point conferencing whereby two user sites can be connected through the public-switched telephone network without passing through the central station SW. In this alternative embodiment, the two users are able to conduct a voice conference while simultaneously viewing shared data objects. This aspect is achieved by having one of the two users initially perform a file transfer with the other user so that each user has a copy of the data objects required for a conference prior to the start of the voice mode portion of the conference. Again, since the file transfers of the data objects occur prior to the voice mode portion of the conference, interruption of the voice mode to download data objects is avoided. When the two users in the point-to-point conference enter the voice mode, a virtual visual conference is established simultaneously with the voice conference by coordinating the display of the data objects using the same in-band conference control signals as described for the multipoint conferencing.

There are three forms of data rode conferencing in which users may transmit and receive data signals. In a data collaboration mode, two or more users are able to collaborate to perform a whiteboard function. The users in the data collaboration mode are connected through the central station SW to the host computer HC, each user having an individual data session. In a private data file transfer mode, two users are interconnected through the central station SW to provide for private file transfers between the two users without involving the host computer HC. There is also a private data broadcast mode in which two or more users are interconnected via the central station SW to allow a user to broadcast a file to the other users. In the private data broadcast mode, there is no handshaking between user modems.

The data collaboration mode for the preferred embodiment will now be described in more detail. As noted above, users in the data collaboration mode are passed through the central station SW to the host computer HC and conduct individual data sessions with the host computer HC. However, if the users seeking to take part in the data collaboration mode are currently in a voice mode conference, the users must be switched into data mode before data collaboration can occur. This is accomplished by the user computer associated with the currently designated lead speaker sending a DTMF conference control signal via its respective user station to the other users in the conference to switch to data mode after a designated time, e.g., ten seconds. The user stations of the other users in the conference detect the conference control signal and are switched from voice mode to data mode at the designated time.

Once the data collaboration mode is entered and the whiteboard session is activated in the host computer HC, the designated lead speaker may freely draw upon a virtual whiteboard area using an input device such as a mouse connected to the user computer of the lead speaker. The lead speaker's annotations to the whiteboard area are received by the host computer HC and then broadcast as annotation commands to the other users in the conference. User annotations may be overlaid upon data objects such as slides. The lead speaker may elect to allow inputs from other conferees, in which case the annotation input from each additional annotator is assigned a specific color and broadcast to the users in the conference, including the lead speaker. When the whiteboard annotation session is over, the lead speaker sends either a conference control signal to deactivate the whiteboard session while keeping the conference in data mode or a signal to return the conference to voice mode. In the preferred embodiment, a protocol known as Remote Image Protocol (RIP) is used to control manipulation of the data objects which are stored at each of the user computers (SC1-SCN) in a conference. A family of RIP commands coded as DTMF conference control signals may be transmitted, for example, by the lead speaker to other conference attendees during a voice mode conference to coordinate display of selected data objects at each of the attendees respective user computer (SC1-SCN). In a data mode scenario, such as in a whiteboard session, the annotation commands may be RIP commands coded as a series of escape (ESC) sequences. A description of the RIP protocol can be found in "RIP Aint User's Guide," Telegrafix Communications Inc. (September, 1993, Version 1.54), the contents of which are incorporated herein by reference.

Referring again to FIG. 1 to provide more details, the user lines (SL1-SLN) connect to the central station SW via a telephone network NW and terminate on a plurality of line ports (LP1-LPN). The central station SW includes a plurality of computer ports (CP1-CPN) which are coupled to host computer HC via a plurality of host modems (HM1-HMN). A plurality of through ports (TP1-TPN) on the central station SW are available for accessing other services and external networks described further herein. The central station SW provides connections between line ports (LP1-LPN) and computer ports (CP1-CPN) and between line ports (LP1-LPN) and through ports (TP1-TPN). A switch matrix SMX in the central station SW provides interconnections among multiple line ports (LP1-LPN) to form conferences. Operation of the switch matrix SMX will be described further below. The central station SW includes a controller CL for controlling conference and switching actions in the central station SW. The controller CL communicates with the host computer HC through control/data lines HCL. The central station SW also includes a revenue generation module RG which records billing information for all conference and switching actions provided through the central station SW.

At user site SS1, the user line SL1 connects to a user station SU1. The user station SU1 includes a microphone interface M1 and speaker interface SU1 for telephone access, an external interface EXT1, and an auxiliary port AUX1 coupled to an auxiliary device AD1. The user station SU1 includes a data port ML1 which connects to a user computer SC1 via a user modem SM1. The user station SU1 is controlled through control lines CL1 by the user computer SC1 running a TSR (terminate and stay resident) program that shown.

The auxiliary device AD1 connected to the auxiliary port AUX1 can be, for example, a typical audio recording machine. Such an audio recording machine can be used to record the voice communications signals and DTMF conference control signals received over user line SL1 during the voice mode of a conference. This recording arrangement would allow a user to replay and review a complete conference presentation in conjunction with the locally stored data objects from the recorded conference.

The user computer SC1 can be any standard personal computer or workstation having a display screen CS1 and associated memory and peripheral circuitry. The host computer HC is any standard personal computer workstation having a memory MEM and associated peripheral circuitry. The host computer HC is preferably configured as, but not limited to, an electronic bulletin board system. The host computer HC can also be multiple workstations connected via a local area network or other bus arrangement.

Each of the host modems (HM1-HMN) and the user modems (SM1-SMN) can be any standard modem which is capable of modulating digital signals into quasi-analog signals for transmission and demodulating quasi-analog signals into digital signals.

Figure 2:
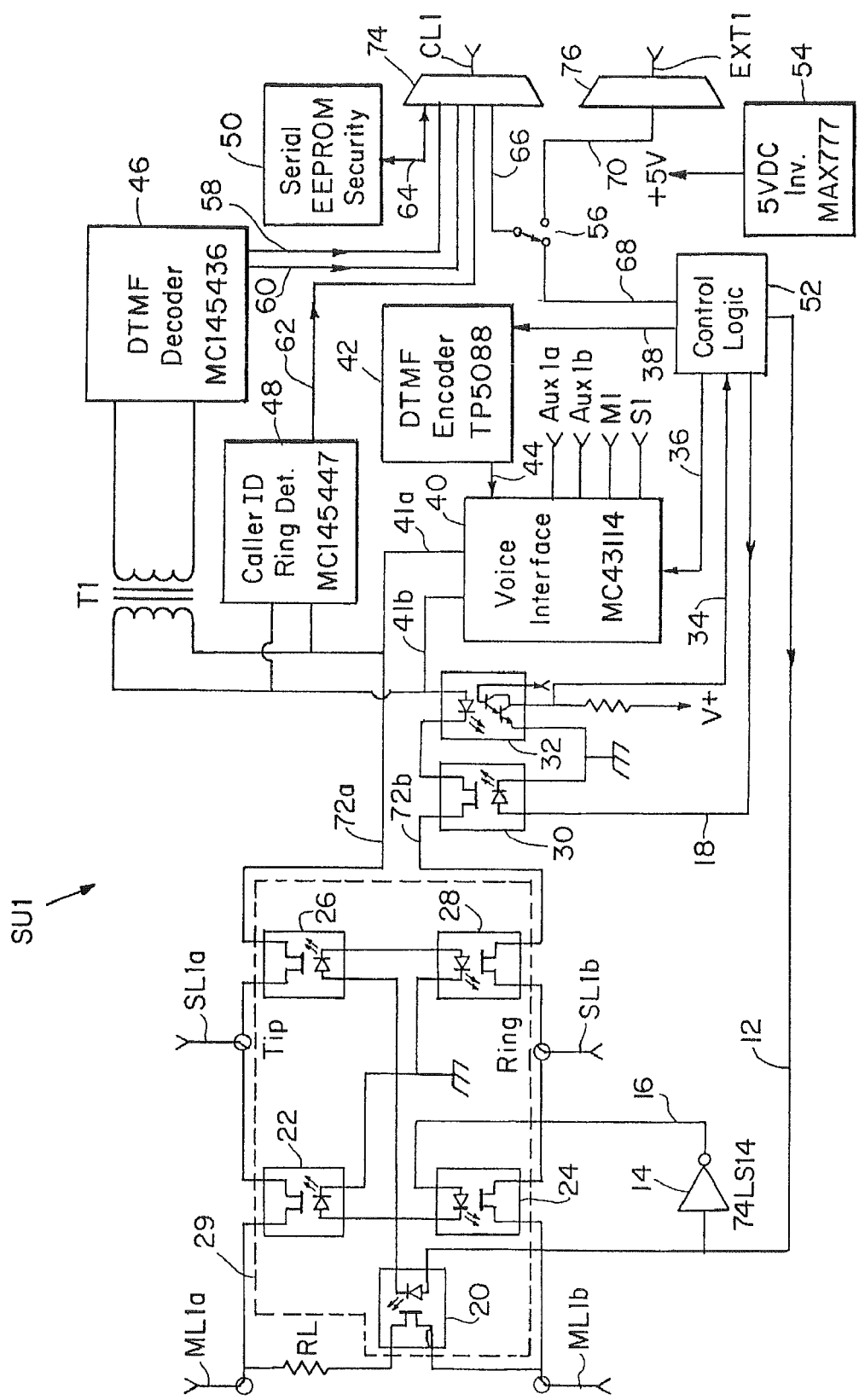
FIG. 2 is a schematic circuit diagram of the user station shown in FIG. 1.

Shown in FIG. 2 is a schematic circuit diagram of user station SU1. The paths SL1a and SL1b of the user line SL1 from the network NW terminate at TIP and RING terminals of the user station SU1. A mode selector 29 comprising switches 20, 22, 24, 26, and 28 provides for selection between voice and data modes of operation. Data port paths ML1a, ML1b connect to user line paths SL1a, SL1b through switches 22, 24. A loopback resistor RL for holding the connection to the user modem SM1 is provided across data port paths ML1a and ML1b through switch 20. The resistor RL is preferably 600 ohms to provide an expected termination towards the modem SM1. Switches 26, 28 provide connection between user line paths SL1a, SL1b and telephony paths 72a, 72b. A voice interface circuit 40 is coupled to telephony paths 72a, 72b to provide telephone voice access to the user line SL1. The voice interface circuit 40 provides auxiliary ports AUX1a, AUX1b for connecting auxiliary devices such as the voice recording machine noted above. Path 41b of the voice interface 40 connects to telephony path 72b through a switch 30 and an opto-isolator 32 connected in series. Operation of switch 30 is enabled through control line 18. The opto-isolator 32 detects off-hook, on-hook condition of the telephony circuit and passes detection information on control line 34.

A DTMF encoder 42 and a DTMF decoder 46 respectively transmit and receive the audible conference control signals. The DTMF encoder 42 receives tone control information on control line 38 and passes tone outputs on line 44 to voice interface 40. The DTMF decoder 46 is inductively coupled across telephony paths 72a, 72b via transformer T1. The DTMF decoder 46 signals tone detection on line 58 and passes decoded tones on line 60.

A caller identification detector 48 is coupled to the telephony paths 72a and 72b to provide standard caller identification information on control line 62. A serial EEPROM 50 stores and maintains security information regarding the user station SU1. Information passes from the EEPROM 50 over path 64. The switches (20-30) preferably are solid state switching devices, such as the OptoMOS.RTM. Solid State Switch LCA110 manufactured by CP Clare Corporation. The DTMF decoder 46 may be, for example, a MC145436 Dual Tone Multiple Frequency Receiver manufactured by Motorola. The DTMF encoder 42 may be, for example, a National Semiconductor TP5088 DTMF Generator. The voice interface 40 may be implemented, for example, with a Motorola MC34114 Telephone Speech Network with Dialer Interface. The caller identification detector 48 may be any one of several calling line identification devices such as a Motorola MC145447 Calling Line Identification Receiver.

Control and data signals pass between the user computer SC1 and a user station SU1 over control lines CL1 which connect through port connector 74. A manual switch 56 allows a control input 66 to be switched between lines 68 and 70. When manual switch 56 is in the position connecting control line 66 to control line 68, the control logic circuitry 52 in response to control signals from the user computer SC1 controls the user station SU1 for voice and data operation. When the manual switch 56 is in the position which connects control line 66 to line 70, the user station SU1 is in a pass-through mode whereby signals on external interface EXT1 may pass through connector 76 through to port connector 74. The pass-through mode allows the port connector 74 to function as a regular LPT parallel port so that a peripheral such as a printer or a satellite downlink receiver may be connected to the user computer.

In the default condition, the mode selector 29 operates in the data mode position. A low signal on control line 12 causes switches 20, 26, and 28 of selector 29 to open, thereby disconnecting the telephony paths 72a, 72b from the user line paths SL1a, SL1b and disconnecting the load resistor RL across the data port paths ML1a, ML1b. The low signal on control line 12 is inverted by an inverter 14 to provide a high signal on control line 16. The high signal on control line 16 causes switches 22, 24 to operate, thereby connecting the data port paths ML1a, ML1b to the user loop paths SL1a, SL1b. Thus, the user modem SM1 (FIG. 1) is connected to the user line SL1 for data mode operation.

A high signal on control line 12 causes the selector 29 to switch to the voice mode. The high signal on control line 12 causes switches 20, 26 and 28 to operate. The operation of switches 26, 28 connects user line paths SL1a, SL1b to telephony paths 72a, 72b. To operate in the voice mode, control line 18 must also be high to operate switch 30. Thus, telephony access is afforded through the voice interface 40 coupled to the telephony paths 72a, 72b.

The operation of switch 20 due to a high signal on control line 12 completes the path between data port path ML1b and load resistor RL. The high signal on control line 12 is inverted by inverter 14 to produce a low signal on control line 16. A low signal on control line 16 causes switches 22, 24 to open, thereby disconnecting the data port paths ML1a, ML1b from the user line paths SL1a, SL1b. Thus, the user modem SM1 (FIG. 1) is disconnected from the user line SL1 and is placed in a loopback state. The load resistor RL across the data port ML1 causes the data port ML1 to appear to be in an off-hook state to a user modem SM1 having on-hook/off-hook detection. In addition, in order to keep the user modem SM1 from timing out due to loss of received carrier, the user computer SC1 sends to the user modem SM1 a disable carrier timeout command, e.g., the AT command ATS10=255.

During the voice mode, an off-hook condition is detected by opto-isolator 32 when current flows through the LED portion of opto-isolator 32 which is coupled to telephony path 72b through switch 30. The photo-darlington portion of the opto-isolator 32 pulls the output line 34 low when current is detected.

Figure 3:
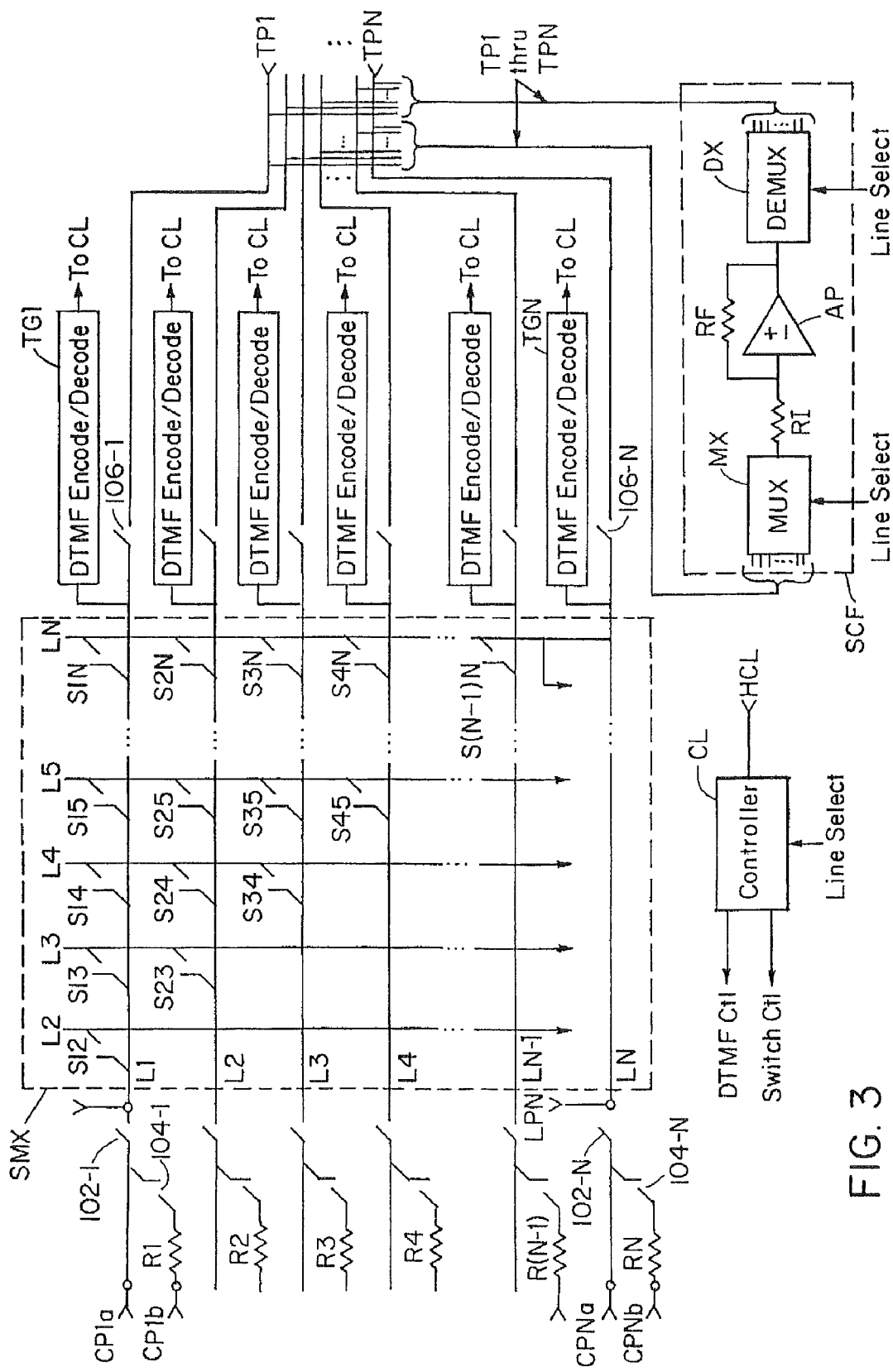
FIG. 3 is a schematic block diagram of the central station shown in FIG. 1.
Figure 4:
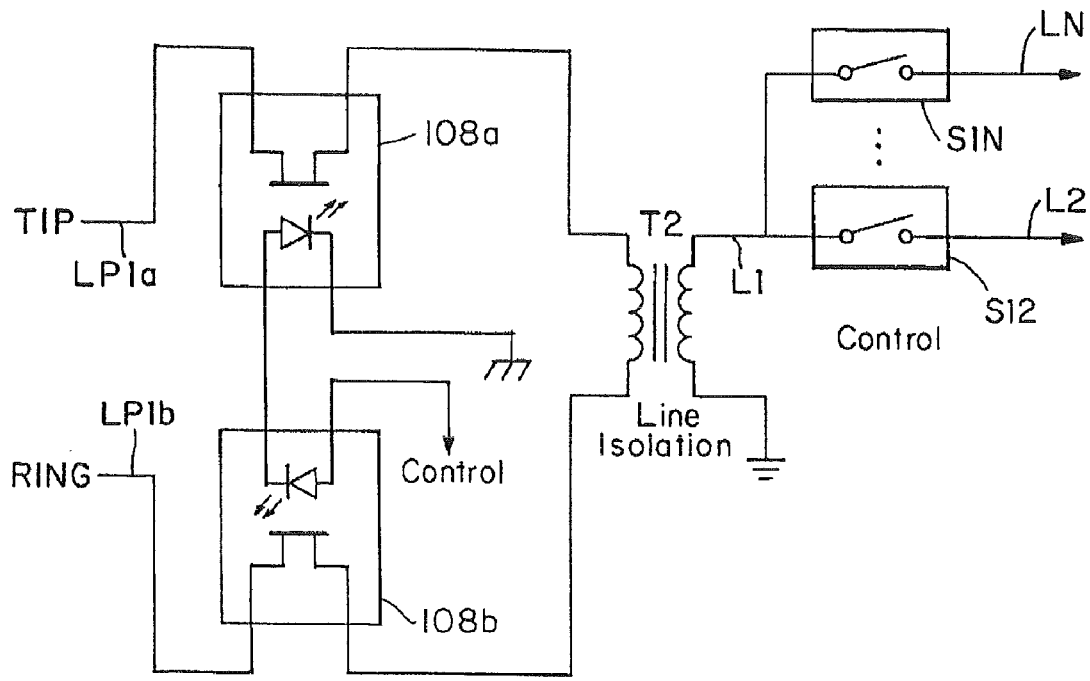
FIG. 4 is a circuit diagram of the switching arrangement for connecting a line port to the switching matrix shown in FIG. 3.

Shown in FIG. 3 is a schematic block diagram of the central station SW. The switch matrix SMX comprises a plurality of horizontal and vertical rails (L1-LN) interconnected through a number of crosspoint switches. The minimum number of crosspoint switches required for interconnection is determined according to the integer value N*(N−1)/2, where N is the number of line ports. In a preferred embodiment, the number of line ports is 16; however, this is noted by way of illustration and not as a limitation of the invention. Each of the line ports (LP1-LPN) is connected to the switch matrix SMX through a switching arrangement as shown in FIG. 4. The TIP (LP1a) and RING (LP1b) of a line port LP1 from the network NW (FIG. 1) are connected through a pair of switches (108a, 108b) and across an isolation transformer T2 which couples AC signals between the line port LP1 and rail L1 of the switch matrix SMX. The rail L1 connects to other rails (L2-LN) through the crosspoint switches (S12-S1N).

Referring again to FIG. 3, the computer ports (CP1-CPN) have paths (CP1a, CP1b-CPNa, CPNb) which connect to respective line ports (LP1-LPN) through switches (102-1-102-N). A resistor R1 and switch 104-1 in series across computer port paths (CP1a, CP1b) provides a loopback termination to hold a connection to the computer modem HM1 in the same manner as described above for the user modems. This loopback termination is repeated on each of the other computer ports (CP2-CPN).

A plurality of DTMF encoder/decoder circuits (TG1-TGN) are coupled to respective rails (L1-LN) for transmitting and receiving audible conference control signals to and from respective user stations (SU1-SUN) (FIG. 1). The through ports (TP1-TPN) are connected to respective line ports (LP1-LPN) through switches (106-1-106-N). All of the switches and DTMF encoder/decoder circuits in the central station SW operate in response to control signals from the controller CL. The switches preferably are solid state switching devices, such as the OptoMOS.RTM. Solid State Switch LCA110 manufactured by CP Clare Corporation. The central station includes a subconferencing circuit SCF which passes attenuated voice and DTMF signals from a main conference to a subconference. The subconference comprises a subset of the main conference attendees who may drop into the subconference to conduct a private conversation while still receiving the main conference voice and DTMF signals. In the subconference circuit SCF, the through ports (TP1-TPN) are connected to a multiplexer MX. The through port associated with the main conference is selected via the multiplexer MX and fed into amplifier AP which attenuates the main conference signal by an appropriate amount, preferably 20 to 30%. The attenuated output is switched via a demultiplexer DX to the through port associated with the subconference to be mixed with the subconference voice signals. In subconferencing operation, the appropriate switches (106-1 to 106-N) are operated to connect the main and subconference through ports to the appropriate rails (L1-LN).

Virtual Conference User Interface

The user interface of the conferencing system of the present invention will now be described. The virtual visual conferencing aspect supports functions that one would find in a real world conference, including: reception area, information folders, conference room, overhead projector and screen, speakers, and attendees.

Figure 5:
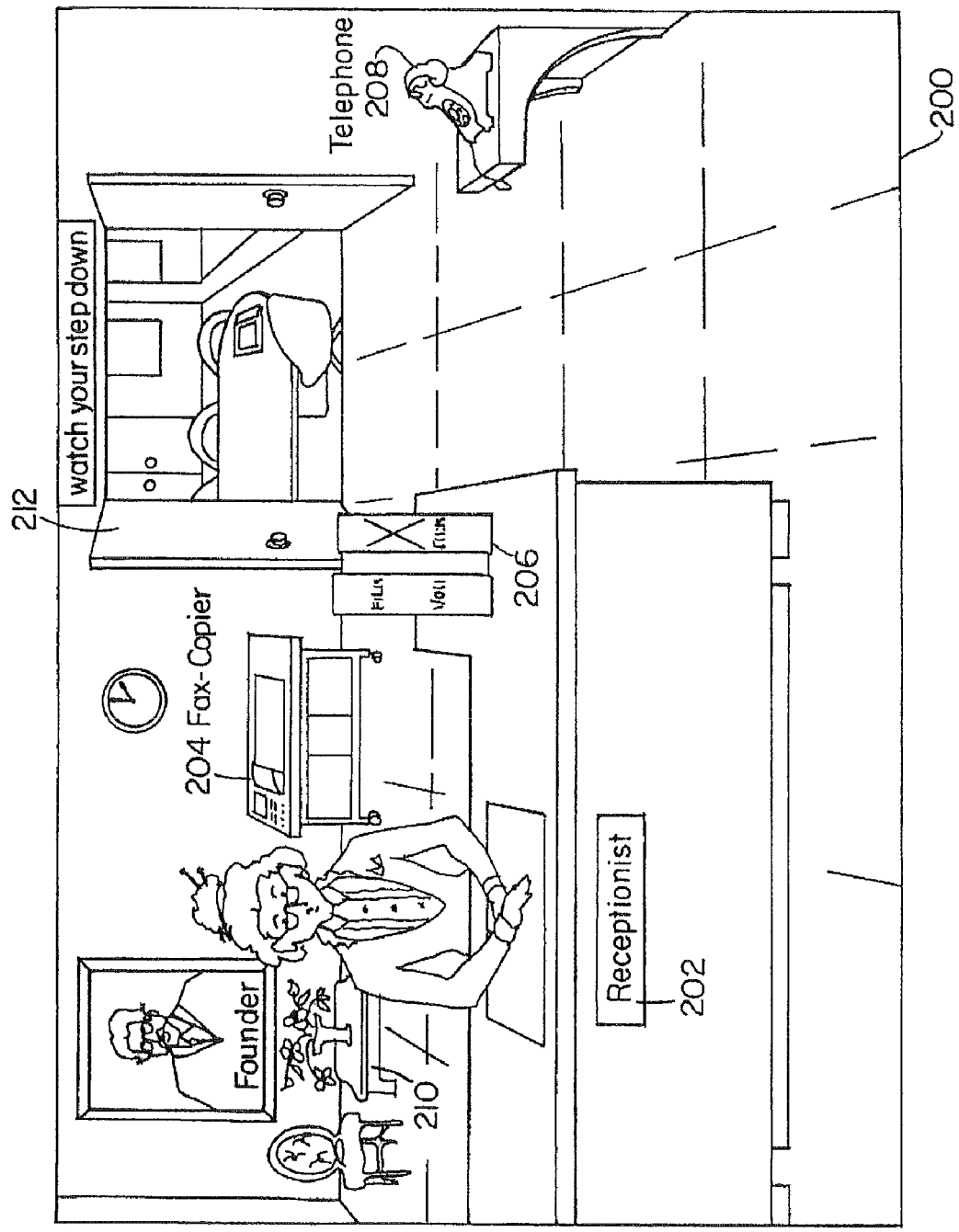
FIG. 5 is a representation diagram of the reception area view of the user interface displayed on computer screen CS1 shown in FIG. 1.

Initially a user establishes a data mode session with the host computer HC and selects a conference room option from a conference menu provided by the host computer HC. The user's screen then displays a representation of a conference reception area as shown in FIG. 5. A conference reception area screen 200 includes several functional areas or icons which are activated via a mouse or keyboard selection. A receptionist icon 202 provides a help function for new users of the conference interface and a reservation function for reserving conference rooms for later conferences. In addition, the receptionist icon 202 provides an announcement/messaging function for announcing arrivals and departures during conferences and for informing attendees of incoming messages. A photocopier icon 204 provides a file transfer function whereby conference presenters upload files containing data objects which are then made available for conference attendees to download through activation of a file folder icon 206. The downloaded data objects, such as slides, are then available for simultaneous viewing during subsequent voice conferences.

Figure 6:
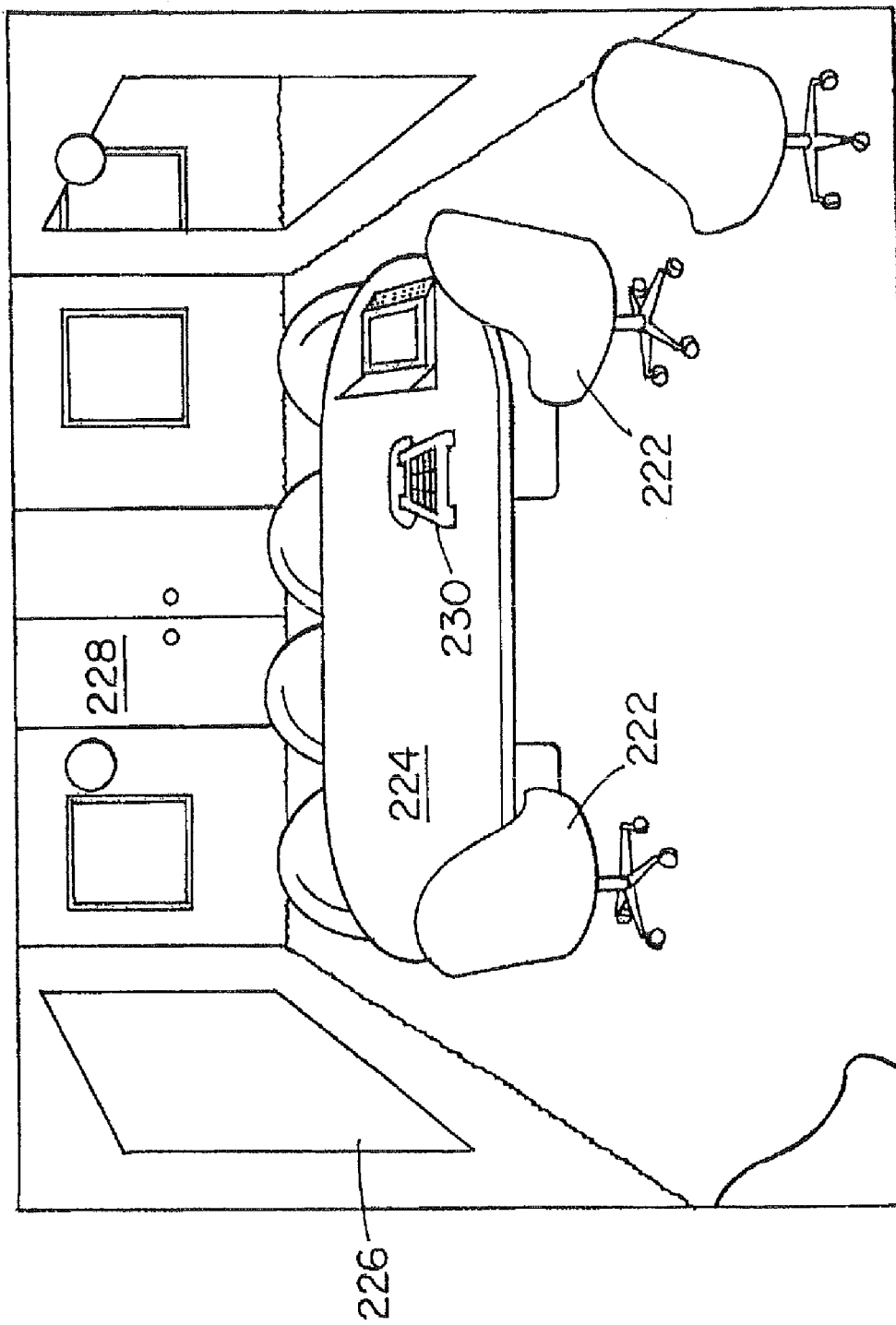
FIG. 6 is a representation diagram of the conference room view of the user interface displayed on computer screen CS1 shown in FIG. 1.

A payphone icon 208 provides a telephone function for allowing a user to switch to voice mode and dial an outside line either via a through port (TP1-TPN) or via an unused line port (LP1-LPN) on the central station SW. A table icon 210 provides a periodicals function whereby a conference attendee waiting for a conference to begin can access an information source, such as an electronic newspaper. A conference room doors icon 212 provides access to a conference room area represented by a conference room screen 220 as shown in FIG. 6. Other functional icons may include a conference schedule icon to provide conference information such as topic, speakers, room number, scheduled date and time, and meeting description.

Referring again to FIG. 5, to reserve a specific conference, the user selects the receptionist icon 202 via a mouse or keyboard input device. The user then enters relevant information regarding the conference, such as conference date and time, topics, approved speakers, and attendees. The user then receives a conference room number which serves to confirm the reservation.

Between the time the reservation has been made and some period before the conference is due to begin, e.g., twenty minutes, all conference presenters, including the lead speaker, may submit any slides, graphs, prepared text, or other data objects to be used in the scheduled conference. To submit such data objects, a presenter at the conference reception area screen 200 selects the photocopier icon 204. The presenter enters appropriate conference identification information and then performs a data mode file transfer from the respective user computer SC1 to the host computer HC. The data objects are then combined with any other data objects submitted for the same conference and the combined data objects are represented by the folder icon 206 in the reception area screen 200. Each modification made by a presenter to previously submitted material is indicated by a revision letter on the folder icon 206. When the lead speaker and all other approved presenters have "signed off" on their respective contributions, the folder icon is marked "FINAL", which signifies to conference attendees that they are retrieving the correct and complete version of the data objects for the conference.

At conference time, the lead speaker selects the conference room doors icon 212 on the reception area screen 200 and is then presented with the conference room screen 220 (FIG. 6).

The lead speaker and the attendees are each presented with conference information on their associated computer screens (CS1-CSN), including a visual depiction of the conference room and function buttons for activating certain overhead and voice/data functions. In the visual depiction of the conference room, the lead speaker and attendees are represented at individual chairs 222 positioned around a conference table 224. The visual depiction of the conference room will automatically adjust to accommodate as many attendees as are present. An overhead projector screen area 226 is zoomed in when the presentation begins to display the stored data objects in a sequence selected under the control of the lead speaker. A conference room doors icon 228 provides access to the reception area screen 200 and allows a conference attendee to leave the conference. A telephone icon 230 provides a telephone function for allowing voice conference attendees to "patch-in" an outside line either via a through port (TP1-TPN) or via an unused line port (LP1-LPN) on the central station SW.

Figure 7:
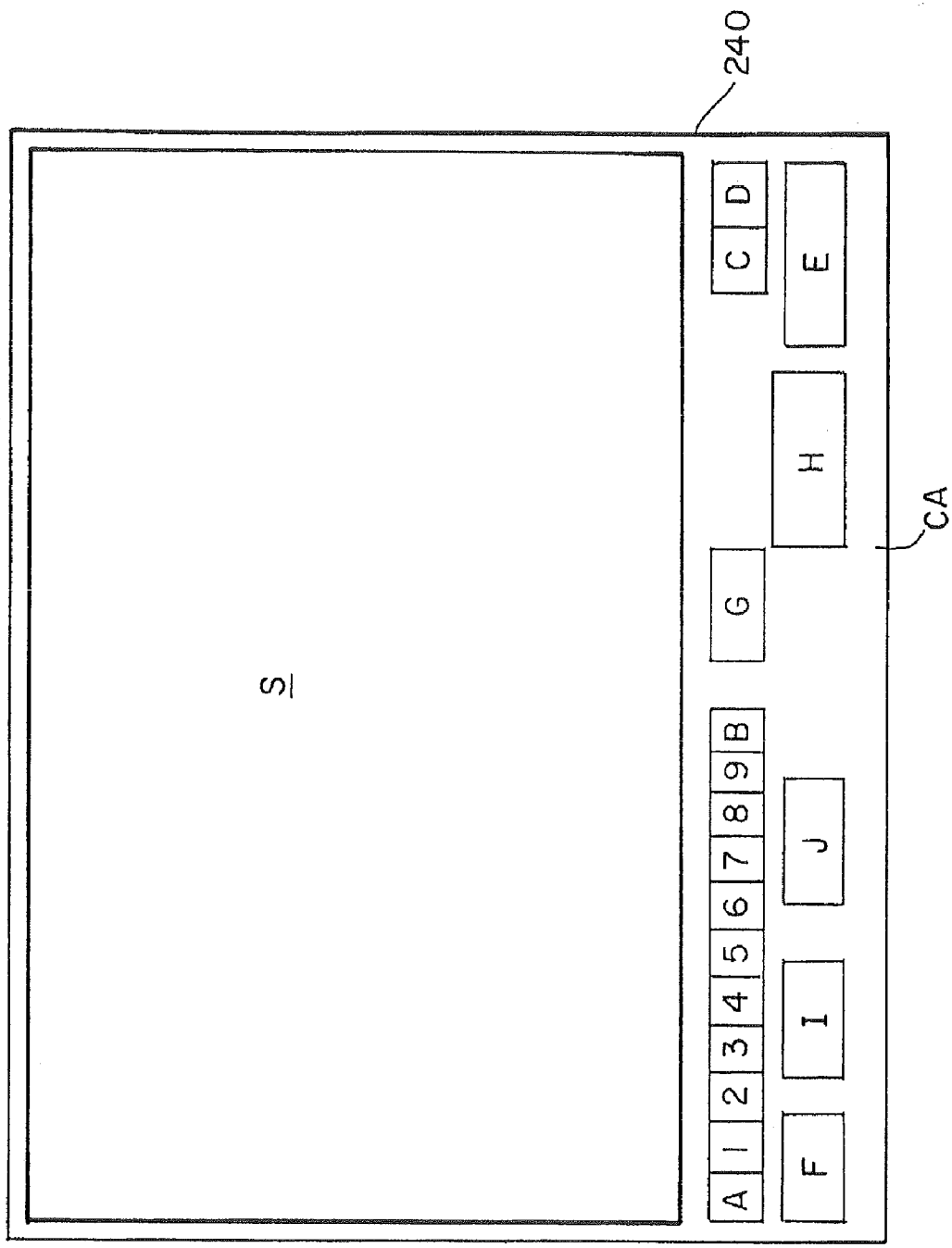
FIG. 7 is a representation diagram of the overhead view of the user interface displayed on computer screen CS1 shown in FIG. 1.

When the lead speaker elects to begin a presentation, an overhead view screen 240 is displayed on computer screen CS1 as shown in FIG. 7. The overhead view screen 240 includes a conference display area S and a conference control area CA. In the conference display area S, locally stored data objects such as slides are presented. The conference control area CA includes software-controlled conference function buttons, some of which are available only to the lead speaker. The conference function buttons can include, for example, sequential slide movement buttons A and B (forward and reverse respectively), random slide access buttons (1-N), refresh slide button G, go digital directive button C, go voice directive button D, leave conference button F, mute control button I, dumb control button J, lead speaker selection button H, and whiteboard annotation button E. Other conference functions can include gain control, whisper sub-conferencing, and a kick out function. Examples of these conference functions are described in more detail herein.

Conference Control Signals and Functions

Figure 8:
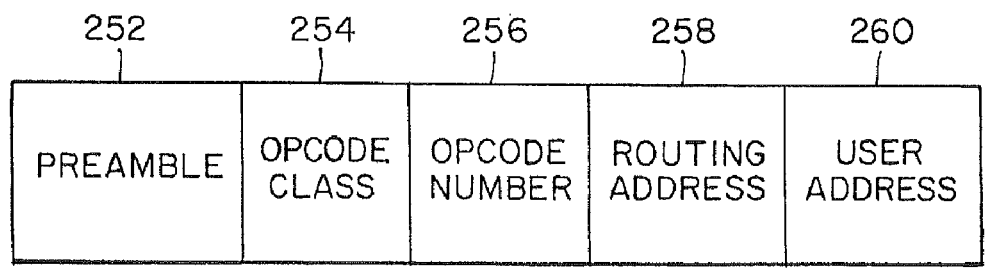
FIG. 8 is a representation of the format used for audible conference control signals.

The conference control signals corresponding to conference commands comprise a series of opcodes implemented by DTMF tones in a format shown in FIG. 8. The opcode format comprises a preamble field 252, an opcode class field 254, an opcode number field 256, a routing address field 258, and a user address field 260. The preamble field 252 consists of a single DTMF hexD tone.

The opcode class field 254 comprises a single DTMF tone to indicate up to 15 classes of opcodes. The opcode number field 256 comprises two DTMF tones to indicate up to 225 opcodes per class. The routing address field 258 and the user address field 260 are optional, depending upon the opcode used. The routing address field 258 can be from zero to eight tones in length and is used to indicate a particular central station in a network of central stations of the present invention as described further below. The user address field 260 can be from zero to eight tones in length and is used to indicate a particular line port of the central station indicated in the routing address field 258.

The opcode tone duration is defined on a conference by conference basis. Initially, the system attempts a tone duration of 40 ms and increases the duration in increments of 10 ms, up to a duration of 100 ms, until a duration is reached that satisfies all conference participants.

The conference control opcodes are illustrated by, but not limited to, the protocol records in the following table:

| Command Name | Class | Origin | Destination | Opcode Format |
|---|---|---|---|---|
| use_payphone | telephony | user | Host computer and central station | |
| hang_up | telephony | user | Central station | D001 |
| digital_to_voice | mode | user | Host computer and Central station | |
| end_conference | mode | speaker | Central station and user stations | D101 |
| go_digital_self | mode | user n | Central station | D111n |
| go_digital_all | mode | speaker | Central station and user stations | D110 |
| go_digital n | mode | speaker | User station n | D112n |
| kick_out n | mode | speaker | User station n | D121n |
| leave_conference_self | mode | user n | Central station | D131n |
| mute_user n | environment | speaker | User station n | D211n |
| dumb_user n | environment | speaker | User station n | D221n |
| hear_user n | environment | speaker | User station n | D222n |
| speak_user n | environment | speaker | User station n | D212n |
| show slide x | environment | speaker | User stations | D231x |
| private_show_slide xn | environment | speaker | User station n | D232xn |
| refresh | environment | speaker | User stations | D240 |
| turn_floor n | environment | speaker | User station of new speaker n | D251n |
| whisper n | environment | user | Central station and user station n | D261n |
| return_whisper n | environment | user n | Central station | D262n |
| whiteboard | environment | speaker | Central station and user station(s) | D270 |
| turn_floor external rn | routing | speaker | User station n on central station r | D311rrn |
| go_digital rn | routing | speaker | User station n on central station r | D321rrn |
| kick_out rn | routing | speaker | User station n on central station r | D331rrn |
| mute_user rn | routing | speaker | User station n on central station r | D341rrn |
| dumb_user rn | routing | speaker | User station n on central station r | D351rrn |
| hear_user rn | routing | speaker | User station n on central station r | D352rrn |
| speak_user rn | routing | speaker | User station n on central station r | D342rrn |
| whisper rn | routing | user | User station n on central station r | D371rrn |

Control Procedures

Figure 9:
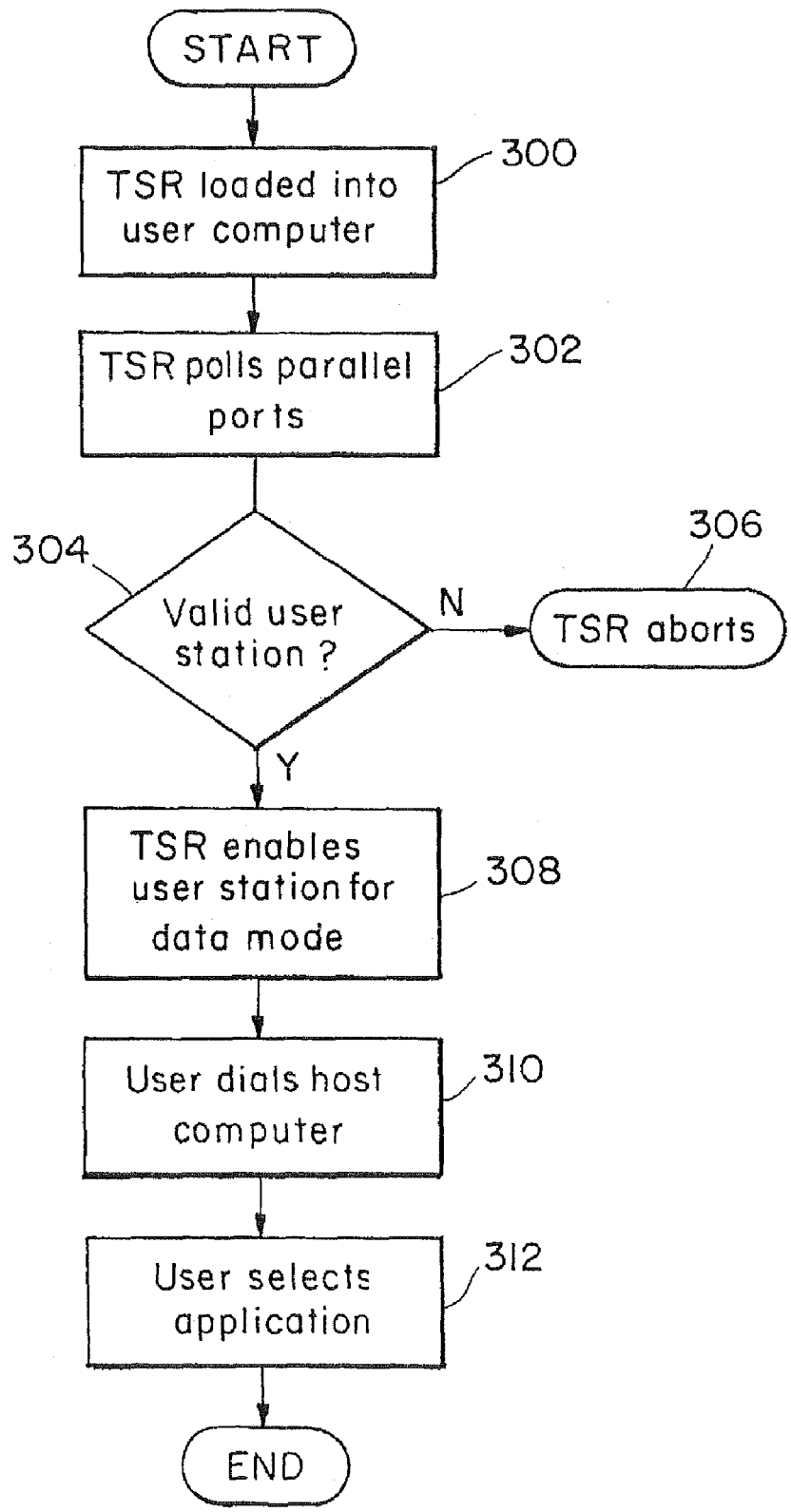
FIG. 9 is a flow chart of the user station activation procedure.

The procedure to activate an individual user station SU1 (FIG. 1) is illustrated by the flow chart shown in FIG. 9. The procedure begins at step 300 when the TSR program is loaded into the user computer. The TSR polls the parallel ports of the user computer at step 302, looking for valid information from EEPROM 50 (FIG. 2). If the TSR does not recognize a valid user station at step 304 based upon the information stored in the EEPROM 50, the TSR aborts at step 306. If a valid user station is recognized at 304, the TSR enables the user station for data mode operation at step 308 by causing control line 12 (FIG. 2) to go low. Once the user station is in the data mode, the user can then dial the host computer at step 310. Having connected to the host computer, the user at step 312 selects an application to run on the host computer, e.g., conferencing and voice services.

In general, the TSR monitors the user modem COM port for data signals which are represented by simple ASCII character strings. The TSR will filter this data from the user and act upon it immediately. The TSR also monitors the user parallel port for signals from the user station.

Figure 10:
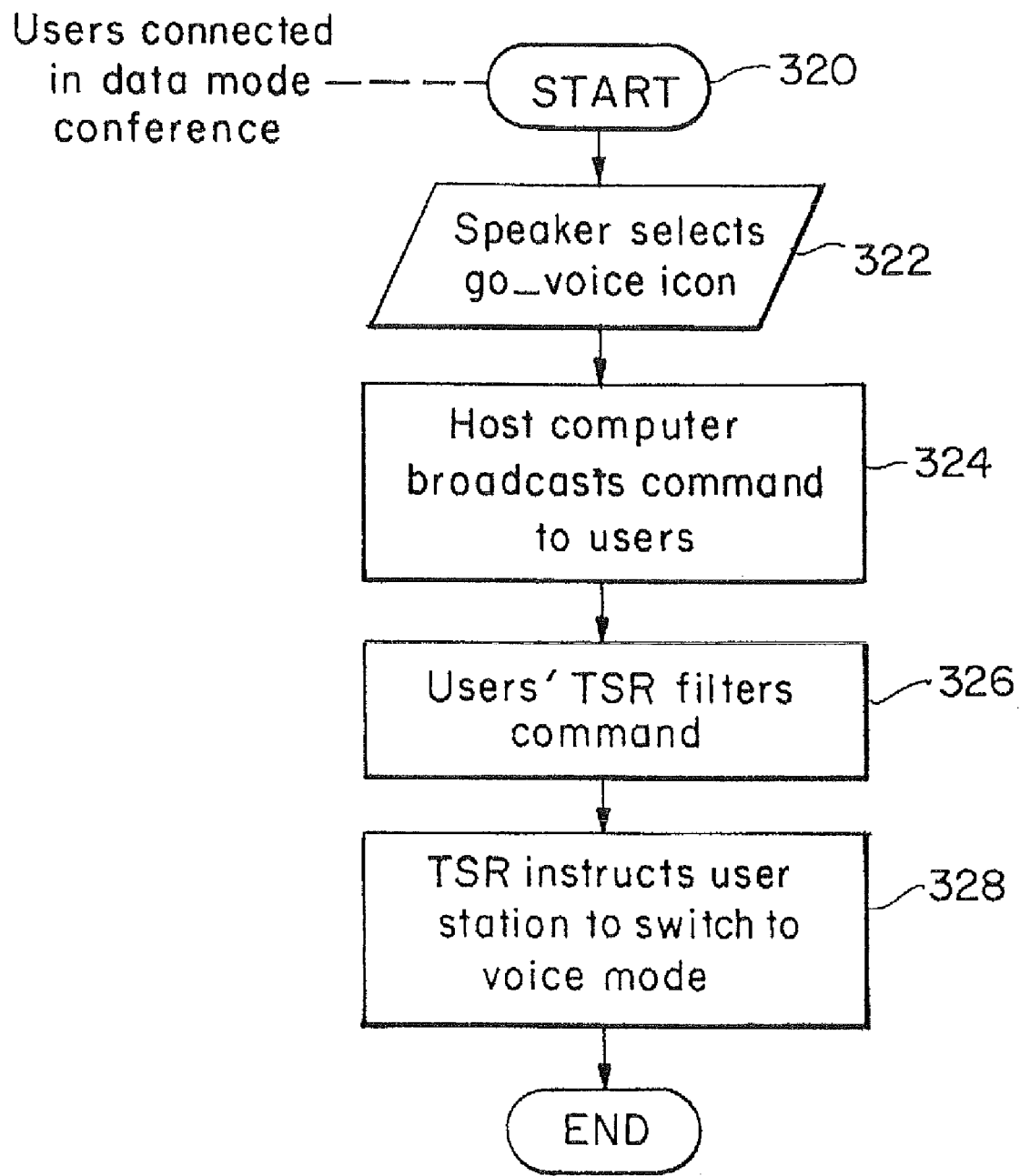
FIG. 10 is a flow chart of the procedure for switching to voice mode during a conference.

A description of several of the conference control procedures possible within a conference will now be provided. The procedure for placing all the conference attendees into voice mode is illustrated by FIG. 10. Starting at step 320, the users are connected in a conference and are in data mode. The lead speaker may select a go_voice icon at step 322 to initiate the procedure. At step 324, the host computer broadcasts the digital go_voice command to all the conference attendees. The TSR at each attendee user computer filters the command at 326 and instructs the user station to switch to voice mode at step 328. At the same step, the host computer communicates with the controller CL of the central station SW (FIG. 1) to interconnect the conference attendees in voice mode.

Figure 11:
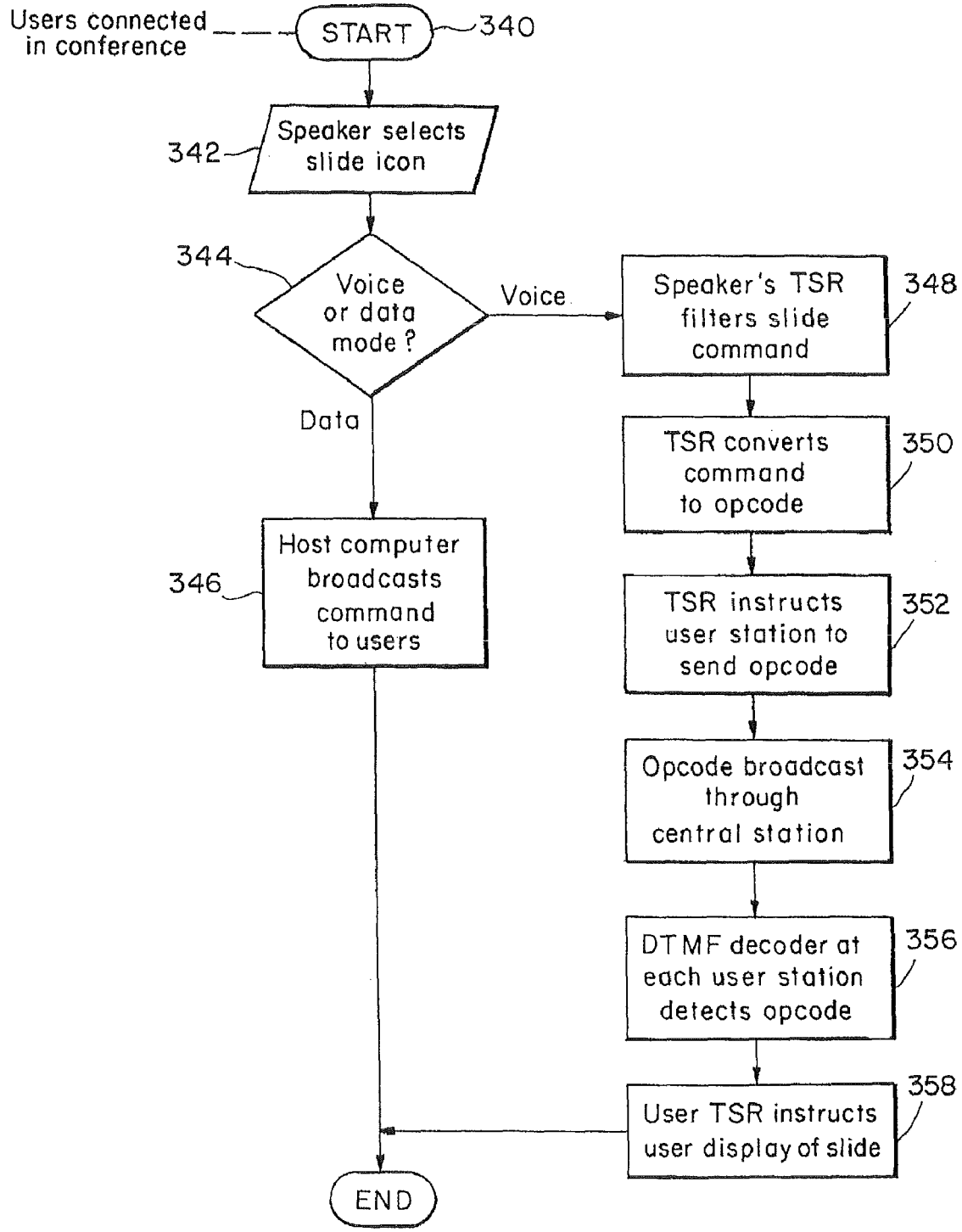
FIG. 11 is a flow chart of the procedure for controlling simultaneous viewing of slides in a conference.

The procedure for coordinating the simultaneous viewing of data objects, or slides, is illustrated in FIG. 11. The procedure begins at step 340 with the users connected in a conference. The lead speaker selects the slide icon at step 342. The TSR determines whether the conference is in data or voice mode at step 344. If the conference is in data mode, the slide command from the lead speaker is broadcast to all conference attendees by the host computer at step 346. If the conference is in voice mode, the speaker's TSR filters the slide command at step 348 and converts the command to a show_slide_n opcode at step 350. The TSR instructs the user station to send the opcode via the DTMF encoder 42 (FIG. 2) at step 352. The opcode tone sequence is broadcast to attendees through the central station SW (FIGS. 1, 3) at step 354. At each attendee user station, the DTMF decoder 46 (FIG. 2) detects the opcode tone sequence at step 356. At step 358, the TSR of each attendee instructs the user computer to display slide n. Thus, although data mode actions between users and the host computer follow a client/server model, in voice mode, many peer-to-peer events take place between users for efficiency and simplicity.

Figure 12:
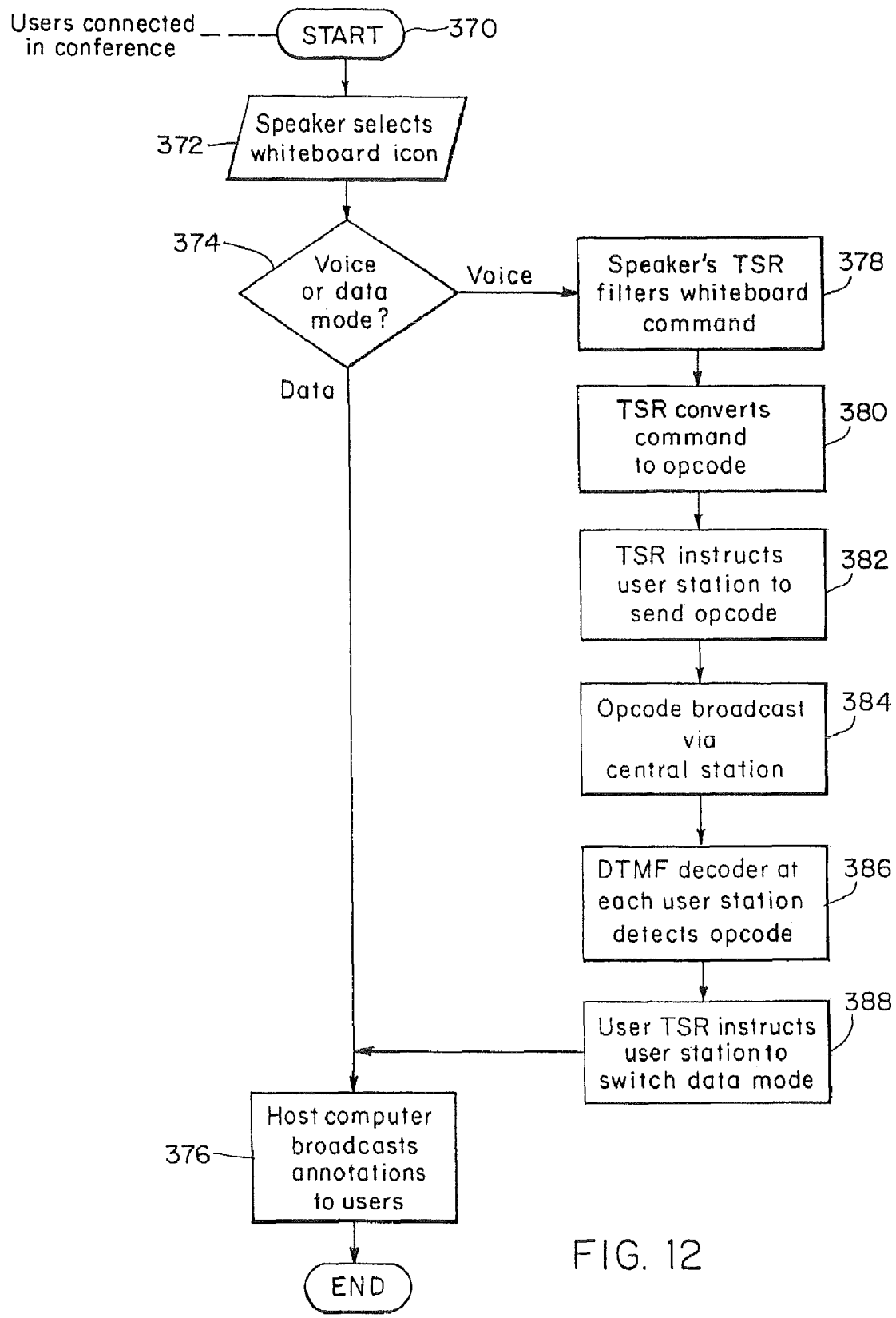
FIG. 12 is a flow chart of the procedure for conducting a whiteboard session in a conference.

The procedure for conducting a whiteboard annotation session is illustrated in the flow chart of FIG. 12. Beginning at step 370 with the users connected in a conference, the speaker may select the whiteboard icon at step 372. The TSR determines whether the conference is in voice or data mode at step 374. If the conference is in data mode, the host computer broadcasts the speaker's annotation commands to all attendees at step 376. If the conference is in voice mode, the conference must be switched over to data mode before annotation can begin. The TSR of the speaker filters the whiteboard command at step 378 and converts the command to a whiteboard opcode at step 380. At step 382 the TSR instructs the user station to send the opcode via the DTMF encoder. The opcode tone sequence is broadcast to the conference attendees through the central station SW (FIG. 3) at step 384. The opcode tone sequence is detected at each user station at step 386. The TSR of each attendee instructs the respective user station to switch to data mode at step 388. At this point, the central station SW also switches to data mode. Annotations from the speaker are then broadcast to the other attendees via the host computer at step 376. In a case where one or more attendees are also given the opportunity to annotate, the annotations of these attendees are broadcast in the same manner.

Figure 13:
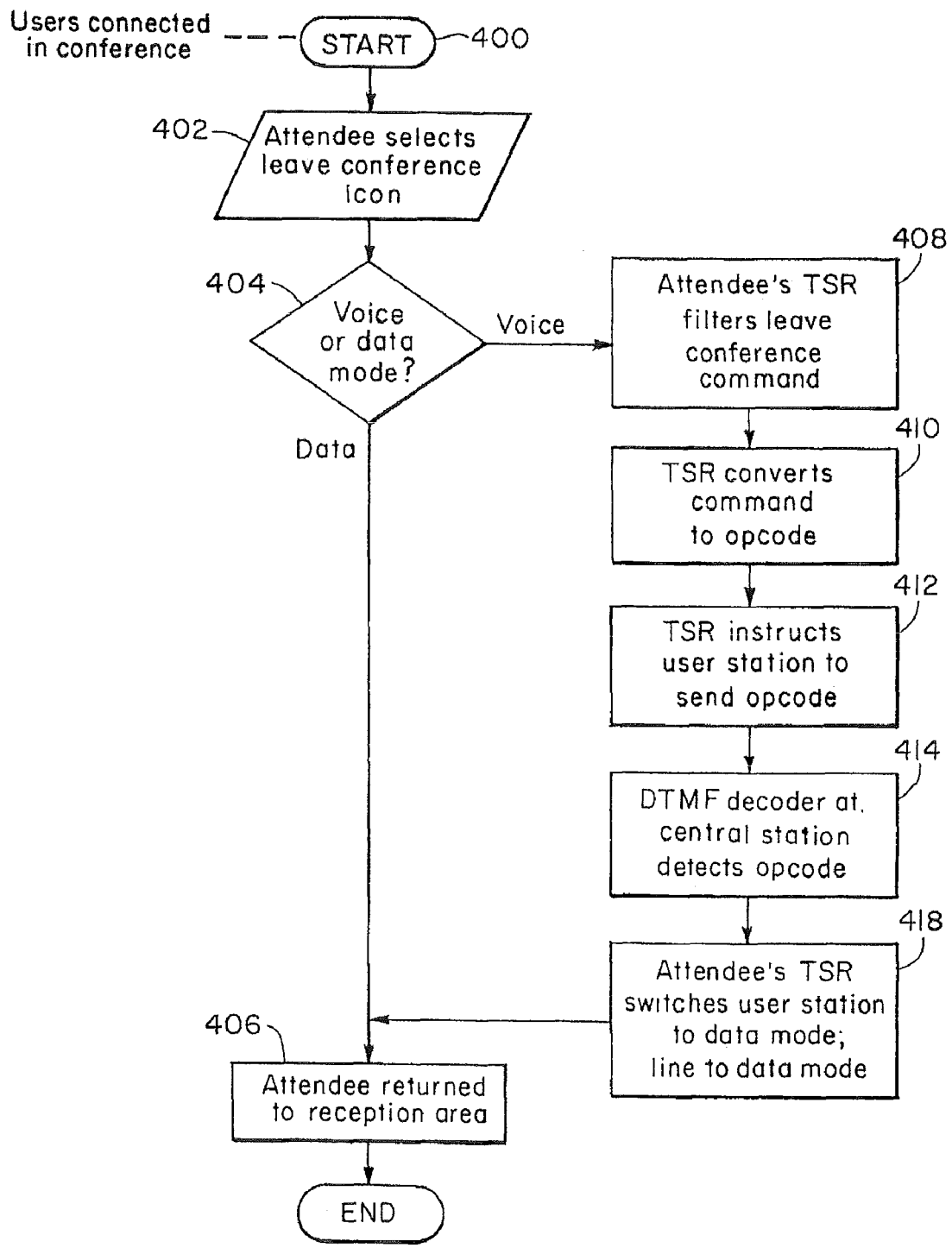
FIG. 13 is a flow chart of the procedure for leaving a conference.

The procedure for allowing an attendee to leave a conference is illustrated in the flow chart of FIG. 13. Beginning at step 400 with the users connected in a conference, an attendee may select the leave_conference icon at step 402. The attendee's TSR determines at step 404 whether the conference is in voice or data mode. If the conference is in data mode, the attendee is returned to the reception area screen 200 (FIG. 5) at step 406. IF the conference is in voice mode, the attendee's TSR filters the leave_conference command at step 408 and converts the command to a leave_conference_self opcode at step 410. The TSR instructs the user station to send the opcode via the DTMF encoder 42 (FIG. 2) at step 412. The opcode tone sequence is detected by a DTMF decoder TGi (FIG. 3) at the central station SW at step 414. From step 418, the attendee's TSR switches the user station to data mode while simultaneously the attendee's line port on the central station SW is switched to data mode. At the data mode, the attendee is returned to the reception area screen at step 406.

Figure 14:
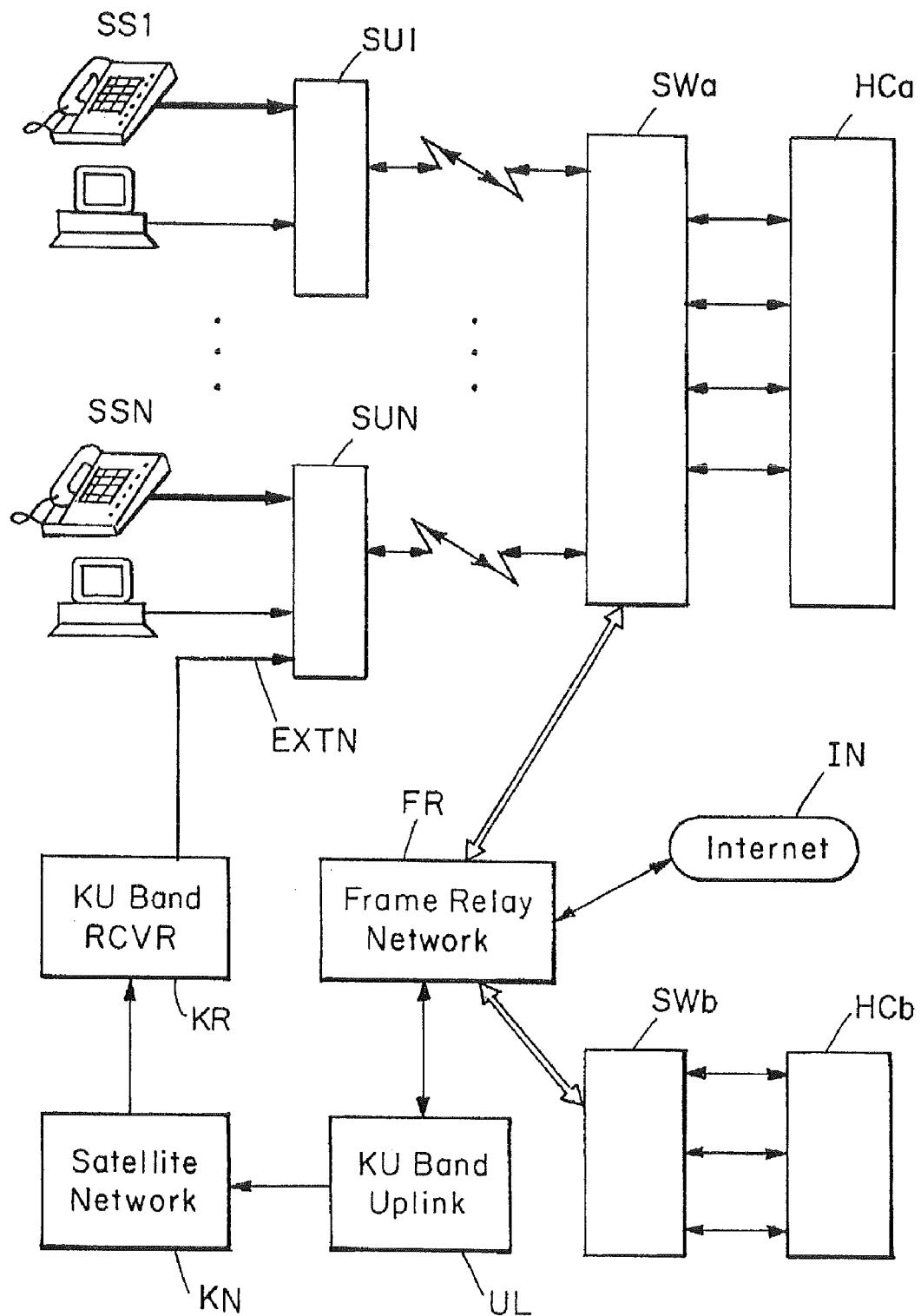
FIG. 14 is a block diagram of a networking arrangement of teleconferencing systems of the present invention.

The teleconferencing system of the present invention can also be configured in a network arrangement as shown in FIG. 14. Two central stations SWa, SWb are shown connected through a frame relay network FR. Two central stations are shown for purposes of example and not as a limitation, i.e., any number of central stations may be interconnected through network FR. The frame relay network FR includes connections to Internet network IN and a Ku-band uplink server UL. The uplink server UL in turn connects via a satellite network KN to a Ku-band receiver KR located at user site SSN and connected to user station SUN.

The network arrangement provides for sharing of communications resources among cooperating BBS systems. Thus, for example, a conference can be conducted among user sites connected across such a network arrangement. A second example is where a first BBS system, such as host computer HCa, has several voice recognition servers. Users associated with a second BBS system, host computer HCb, can then be routed via the frame relay network FR to central station SWa and host computer HCa in order to access a voice recognition application.

A third example is where the uplink server UL connected to the frame relay network FR performs high-speed information downloading to receiver KR. Many telecommunications service providers want to be able to deliver bi-directional data at high bandwidths for multimedia applications. However, in most applications it is more important to deliver large amounts of data to the end user (downloaded), while very little data needs to be sent back to central file servers from end users (uploaded). With the satellite networking arrangement of the present invention shown in FIG. 14, users may receive high-speed file downloads or real-motion video via satellite rather than over narrow bandwidth telephone lines. In operation, the user at user site SSN may request a large file download from the local BBS, host computer HCa. Host computer HCa queues up the file from its internal file storage, or from the Internet IN. The requested file is then routed over the frame relay network FR to the uplink server UL with the user address information. The file is transmitted over the Ku band satellite network KN with user addressing and encryption and received by receiver KR. The received file is then routed through user station SUN to the local digital computer at user site SSN. Billing information for the file transfer is forwarded along with file transfer confirmation to the host computer HCa after a checksum verification indicates that the file was received error-free.

A fourth example combines satellite technology for real-time multimedia information delivery with user/host computer communications to form a complete multimedia system. Referring again to FIG. 14, a user at user site SSN may request to see, for example, a one minute product presentation. One minute of compressed video occupies approximately 12 Mb. The host computer HCa transmits 2 Mb frames every ten seconds through the frame relay network FR and the satellite network KN to the user receiver KR. Each new frame can be loaded directly to the on-board memory of the user digital computer at user site SSN for audio/video playback. Real-time user feedback is communicated between the user and the host computer HCa via the modem connection.

EQUIVALENTS

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A method of conferencing, comprising the steps of:
   interconnecting a plurality of user sites to establish a conference among the user sites by each user site connecting to a host computer and selecting a conferencing application to run on the host computer;
   retrieving, by at least one user site of the plurality of user sites, a set of one or more data objects from the host computer;
   processing the set of one or more data objects in a storage device operationally coupled to a user site of the at least one user site, wherein the storage device is operationally coupled to a display system;
   selecting a data object from the set of one or more data objects and transmitting a signal to indicate the selected data object, the signal including an address indicating the user site of the at least one user site; and
   receiving the signal by the user site based on the signal including the address indicating the user site, and displaying the selected data object on the display system in response to the step of receiving the signal.

2. The method of claim 1, wherein the step of retrieving the set of one or more data objects comprises retrieving data objects having a graphical representation.

3. The method of claim 1, wherein the step of retrieving the set of one or more data objects comprises retrieving a set of data objects of at least one of common data objects and private data objects.

4. The method of claim 1, wherein the signal is represented by ASCII characters.

5. The method of claim 1, wherein the step of retrieving the set of one or more data objects comprises retrieving data objects that are image data.

6. The method of claim 5, wherein the image data are in a format selected from the group consisting of Joint Photographic Experts Group (.JPG), graphic interchange (.GIF), and fractal image compression (.FTC).

7. The method of claim 1, wherein the step of retrieving the set of one or more data objects comprises retrieving data objects that are video data.

8. The method of claim 7, wherein the video data is in full multimedia file format (.MPG).

9. The method of claim 1, wherein the step of retrieving the set of one or more data objects comprises retrieving data objects that are text.

10. The method of claim 9, wherein the text is one of standard ASCII text (.TXT) and Microsoft rich text (.RTF).

11. The method of claim 1, wherein the step of retrieving the set of one or more data objects comprises retrieving data objects that are in a computer aided design (CAD) format.

12. The method of claim 1, wherein the step of retrieving the set of one or more data objects comprises retrieving data objects that are drawings.

13. The method of claim 12, wherein the drawings are in the file format .BMP.

14. The method of claim 1, wherein the step of retrieving the set of one or more data objects comprises retrieving data objects that are spreadsheets.

15. The method of claim 14, wherein the spreadsheets are in the file format .XLS or .WK1.

16. The method of claim 1, wherein step of retrieving the set of one or more data objects comprises retrieving data objects that are word processing files.

17. The method of claim 16, wherein the word processing files are in the format .DOC.

18. The method of claim 1, wherein the step of retrieving the set of one or more data objects comprises retrieving data objects that are slides in a slide presentation.

19. The method of claim 18, wherein the slide presentations is in the file format .PPT.

20. The method of claim 1 further comprising the steps of, at a respective user site of the plurality of interconnected user sites, transmitting one signal to other user sites of the plurality of interconnected user sites and receiving another signal from the other user sites.

21. The method of claim 1, wherein the step of interconnecting the plurality of user sites includes operationally connecting the user site into the conference via a wide area network, wherein the wide area network comprises an Internet network.

22. The method of claim 1, wherein the step of interconnecting the plurality of user sites includes operationally connecting the user site into the conference via a wide area network, wherein the wide area network comprises a satellite network.

23. The method of claim 1, wherein the receiving step further comprises:
   storing the received signal, wherein the received signal is a control signal; and
   subsequently retrieving the stored control signal, wherein the step of displaying the selected data object is performed in response to the step of retrieving the stored control signal.

24. The method of claim 23, wherein the steps of retrieving the stored control signal and displaying the selected data object occur non-simultaneously at each user site of the at least one user site.

25. The method of claim 1 further comprising the steps, at the user site, of:
   recording the signal to produce a recorded signal, wherein the signal is a control signal; and
   playing the recorded control signal, wherein the step of displaying the selected data object on the display system is performed in response to the step of playing the recorded control signal.

26. The method of claim 25, wherein the control signal is a voice communications signal.

27. A method of conferencing, comprising the steps of:
   interconnecting a plurality of user sites to establish a conference among the user sites by each user site connecting to a host computer and selecting a conferencing application to run on the host computer;

retrieving, by at least one user site of the plurality of user sites, a set of executable data objects from the host computer;

processing the set of executable data objects in a storage device operationally coupled to a user site of the at least one user site, wherein the storage device is operationally coupled to a display system;

selecting an executable data object from the set of executable data objects and transmitting a signal to indicate the selected executable data object, the signal including an address indicating the user site of the at least one user site; and receiving the signal by the user site based on the signal including the address indicating the user site, and displaying the selected executable data object on the display system in response to the step of receiving the signal.

28. The method of claim 27, wherein the step of retrieving the set of executable data objects comprises retrieving a set of data objects of at least one of common data objects and private data objects.

29. The method of claim 27, wherein the step of retrieving the set of executable data objects comprises retrieving data objects that are image data.

30. The method of claim 29, wherein the image data are in a format selected from the group consisting of Joint Photographic Experts Group (.JPG), graphic interchange (.GIF), and fractal image compression (.FTC).

31. The method of claim 27, wherein the step of retrieving the set of executable data objects comprises retrieving data objects that are video data.

32. The method of claim 31, wherein the video data is in full multimedia file format (.MPG).

33. The method of claim 27, wherein the step of retrieving the set of executable data objects comprises retrieving data objects that are text.

34. The method of claim 33, wherein the text is one of standard ASCII text (.TXT) and Microsoft rich text (.RTF).

35. The method of claim 27, wherein the step of retrieving the set of executable data objects comprises retrieving data objects that are in a computer aided design (CAD) format.

36. The method of claim 27, wherein the step of retrieving the set of executable data objects comprises retrieving data objects that are drawings.

37. The method of claim 36, wherein the drawings are in the file format .BMP.

38. The method of claim 27, wherein the step of retrieving the set of executable data objects further comprises retrieving data objects that are spreadsheets.

39. The method of claim 38, wherein the spreadsheets are in the file format .XLS or WK1.

40. The method of claim 27, wherein step of retrieving the set of executable data objects comprises retrieving data objects that are word processing files.

41. The method of claim 40, wherein the word processing files are in the format .DOC.

42. The method of claim 27, wherein the step of retrieving the set of executable data objects comprises retrieving data objects that are slides in a slide presentation.

43. The method of claim 42, wherein the slide presentations is in the file format .PPT.

44. The method of claim 27 further comprising the steps of, at a respective user site of the plurality of interconnected user sites, transmitting one signal to other user sites of the plurality of interconnected user sites and receiving another signal from the other user sites.

45. The method of claim 27, wherein the step of interconnecting the plurality of user sites includes operationally connecting the user site into the conference via a wide area network, wherein the wide area network comprises an Internet network.

46. The method of claim 27, wherein the step of interconnecting the plurality of user sites includes operationally connecting the user site into the conference via a wide area network, wherein the wide area network comprises a satellite network.

47. The method of claim 27, wherein the step of retrieving the set of executable data objects further comprises:

storing the received signal, wherein the received signal is a control signal; and subsequently retrieving the stored control signal, wherein the step of displaying the selected data object is performed in response to the step of retrieving the stored control signal.

48. The method of claim 47, wherein the steps of retrieving the set of executable data objects and displaying the selected data object occur non-simultaneously at each user site of the at least one user site.

49. The method of claim 27 further comprising the steps, at the user site, of:

recording the signal to produce a recorded signal, wherein the signal is a control signal; and playing the recorded control signal, wherein the step of displaying the selected data object on the display system is performed in response to the step of playing the recorded control signal.

50. The method of claim 49, wherein the control signal is a voice communications signal.

51. A conferencing method comprising:

establishing, by a central site, a conference by interconnecting a plurality of user computers, wherein said plurality of user computers includes a first user computer and a second user computer;

receiving, by said central site, a data object from said first user computer;

locally storing, by said central site, said received data object; and disseminating, by said central site, said locally stored data object to at least said second user computer as directed by a signal received by said central site from any user computer of said plurality of user computers during said conference.

52. The method of claim 51, wherein said signal is a Dual Tone Multi-Frequency (DTMF) signal.

53. A conferencing method comprising:

providing a first user computer initiating an interconnection of a plurality of user computers in a conference by sending a command to a central site including a host computer, wherein said plurality of user computers includes said first user computer and a second user computer, and wherein said first and second user computers are connected to said central site;

transmitting, by said first user computer, a data object to said central site, wherein a result of said transmitting said data object is a local storage of said data object at said central site; and initiating, by said first user computer, a dissemination of said data object to at least said second user computer by transmitting a signal during said conference.

54. The method of claim 53, wherein said signal is a Dual Tone Multi-Frequency (DTMF) signal.

55. A conferencing method comprising:
  providing a first user computer of a plurality of user computers interconnecting in a conference to at least a second user computer of said plurality of user computers as directed by a command sent by said second user computer to a central site including a host computer, wherein said first and second user computers are connected to said central site; and
  receiving, by said first user computer, a dissemination of a data object transmitted to said central site by said second user computer and locally stored at said central site, wherein said dissemination is directed by a signal transmitted by said second computer of said plurality of user computers during said conference.

56. The method of claim 55, wherein said signal is a Dual Tone Multi-Frequency (DTMF) signal.

57. A computer program product for conferencing, the computer program product comprising:
  a tangible, computer-readable storage device;
  first program instructions to initiate an interconnection of a plurality of user computers in a conference by sending a command to a central site including a host computer, wherein said plurality of user computers includes a first user computer and a second user computer, and wherein said first and second user computers are connected to said central site;
  second program instructions to perform a transmission of a data object to said central site, wherein a result of said transmission of said data object is a local storage of said data object at said central site; and
  third program instructions to initiate a dissemination of said data object to at least said second user computer of said plurality of user computers by a transmission of a signal during said conference,
  wherein said first, second and third program instructions are stored on said tangible, computer-readable storage device.

58. A computer program product for conferencing, the computer program product comprising:
  a tangible, computer-readable storage device;
  first program instructions to interconnect a first user computer of a plurality of user computers to at least a second user computer of said plurality of user computers in a conference as directed by a command sent by said second user computer to a central site including a host computer, wherein said first and second user computers are connected to said central site; and
  second program instructions to receive a dissemination of a data object transmitted to said central site by said second user computer and locally stored at said central site, wherein said dissemination is directed by a signal transmitted by said second user computer of said plurality of user computers during said conference,
  wherein said first and second program instructions are stored on said tangible, computer-readable storage device.

59. The method of claim 1, further comprising the steps of:
  receiving, by the host computer and from a first user site of the plurality of user sites, a first subset of data objects to the host computer;
  receiving, by the host computer and from a second user site of the plurality of user sites, a second subset of data objects to the host computer, wherein the first and second subsets of data objects are different;
  combining, by the host computer, the first subset of data objects and the second subset of data objects into a common set of data objects;
  storing, by the host computer, the common set of data objects in a central repository; and
  disseminating, by the host computer, the common set of data objects from the central repository to the plurality of user sites.

60. The method of claim 59, further comprising:
  selecting a data object of the common set of data objects;
  transmitting a plurality of signals, each signal of the plurality of signals indicating the selected data object of the common set of data objects, wherein the signals respectively include addresses, and wherein the addresses respectively indicate user sites of the plurality of user sites;
  receiving the signals by respective user sites of the plurality of user sites based on the addresses that are included in the signals and that respectively indicate the user sites; and
  responsive to the step of receiving the signals, displaying the selected data object on a plurality of display systems, wherein the display systems of the plurality of display systems are respectively coupled to the user sites of the plurality of user sites.

61. The method of claim 1, further comprising interconnecting a second plurality of user sites to further establish the conference by each user site of the second plurality of user sites connecting to a second host computer, wherein the host computer and the second host computer are connected via a network, wherein the signal further includes a routing address indicating the host computer rather than the second host computer, and wherein the step of receiving the signal by the user site is further based on the signal including the routing address indicating the host computer rather than the second host computer.

62. The method of claim 1, further comprising the steps of:
  generating, by a first user site of the plurality of user sites, a command to display the selected data object, wherein the first user site is a designated lead speaker of the conference, wherein the step of selecting the data object is performed by the first user site;
  converting, by the first user site, the command to display the selected data object into the signal to indicate the selected data object;
  subsequent to the step of converting the command into the signal, transmitting, by the first user site, the signal to a central site that includes the host computer, wherein the central site is not included in the plurality of user sites;
  receiving, by the central site, the signal transmitted by the first user site; and
  responsive to the step of receiving the signal by the central site, broadcasting the signal by the central site to other users sites of the plurality of user sites, wherein the step of receiving the signal by the user site is in response to the step of broadcasting the signal by the central site.

* * * * *